United States Patent [19]

Elshof et al.

[11] 4,159,177

[45] Jun. 26, 1979

[54] COLOR DISPLAY TUBE, METHOD OF MANUFACTURING SUCH A DISPLAY TUBE HAVING A SHADOW MASK, AND REPRODUCTION MASK FOR USE IN SUCH A METHOD

[75] Inventors: Leonardus A. M. Elshof; Herman F. Van Heek, both of Eindhoven, Netherlands

[73] Assignee: U.S. Philips Corporation, New York, N.Y.

[21] Appl. No.: 813,838

[22] Filed: Jul. 8, 1977

[30] Foreign Application Priority Data

Aug. 4, 1976 [NL] Netherlands ........................ 7608643

[51] Int. Cl.[2] .............................................. G03B 27/00

[52] U.S. Cl. .................................. 355/133; 29/25.17; 96/36.1; 313/403; 354/1; 355/132

[58] Field of Search ............... 354/1; 355/79, 86, 132, 355/133; 313/403; 29/25.17; 96/36.1, 38.3, 46

[56] References Cited

U.S. PATENT DOCUMENTS

| | | | |
|---|---|---|---|
| 3,652,895 | 3/1972 | Tsuneta et al. | 313/403 |
| 3,844,005 | 10/1974 | Yamada et al. | 313/403 X |

*Primary Examiner*—John Gonzales

*Attorney, Agent, or Firm*—Algy Tamoshunas

[57] ABSTRACT

The bridges between apertures located at the edge of the shadow mask of a color display tube are made at least 20% wider than the others. The width of the bridges increases linearly from row to row from the center to the edge of the mask whereby a continuously varying brightness distribution is obtained. The reproduction mask used in the fabrication of such a shadow mask can be made photographically by exposing photosensitive material through a pattern of bridges, rotating the pattern and repeating the exposure.

5 Claims, 10 Drawing Figures

Figure 1:
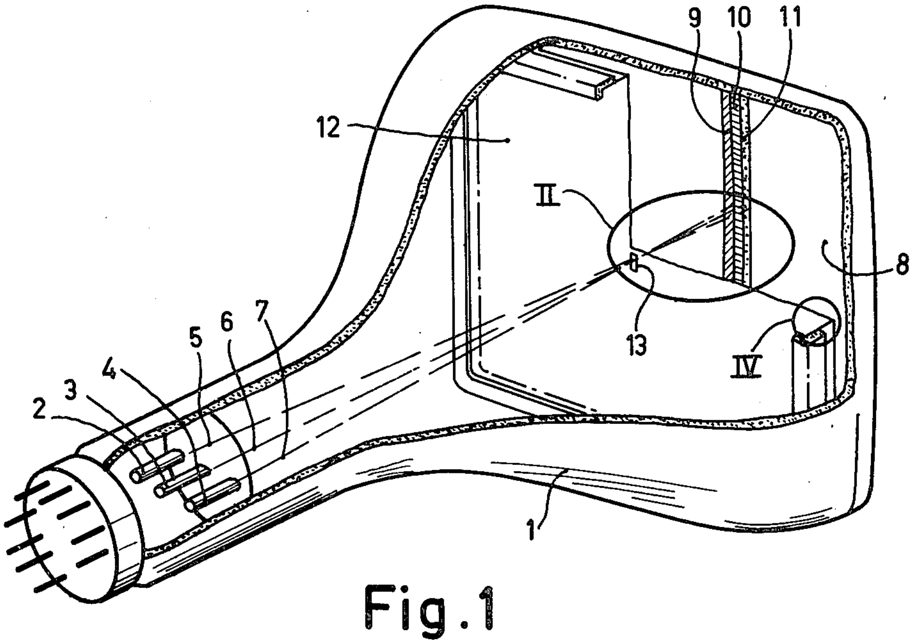

COLOR DISPLAY TUBE, METHOD OF MANUFACTURING SUCH A DISPLAY TUBE HAVING A SHADOW MASK, AND REPRODUCTION MASK FOR USE IN SUCH A METHOD

The invention relates to a colour display tube having a shadow mask comprising a thin metal sheet having a large number of substantially parallel rows of elongate apertures which extend along the rows, each pair of successive apertures in a row being separated by a bridge.

The invention also relates to a method of manufacturing such a colour display tube having a shadow mask and to a reproduction mask used in such a method.

Such colour display tubes comprise, in an evacuated envelope, three electron guns for generating electron beams, a display screen with a large number of parallel stripes luminescing in three different colours and a shadow mask positioned in the envelope adjacent the display screen with the rows of apertures extending parallel to the luminescent stripes. The three electron guns are positioned with their axes in a common plane and at a small angle to each other (the so-called colour selection angle) so that each electron beam impinges only upon luminescent stripes of one colour.

Such colour display tubes are known from U.S. Pat. No. 3,844,005, which discloses a colour display tube having a shadow mask with apertures whose dimensions increase from the edge towards the center of the shadow mask and the width of the bridges hence decreases. The object of such a construction is to improve the brightness of the picture. However, it has been found that this arrangement results in a picture with a non-uniform brightness. It is not possible to increase only the width of the elongate apertures in the center of the shadow mask to an unlimited extent while maintaining the dimensions of the bridges constant since this would result in a deterioration of the colour purity of the display tube, which means that one of the electron beams impinges upon luminescent regions of different colours.

Narrowing the bridges throughout the shadow mask is not possible either, since in that case the shadow mask becomes very weak in the direction at right angles to the rows of elongate apertures. This can result in destruction of the bridges during drape drawing, particularly in the corners of the shadow mask.

It is the object of the invention to provide a colour display tube having a shadow mask which does not tear during drape drawing.

Another object of the invention is to provide a suitable method of manufacturing such a shadow mask by means of a reproduction mask.

A further object of the invention is to provide the reproduction mask necessary to carry out such a method.

According to the invention, a colour display tube having a shadow mask of the kind mentioned in the preamble is characterized in that the bridges in each row of apertures have substantially the same width. In addition, the bridges in at least the three outermost rows nearest each of two opposite edges of the shadow mask are at least 20% wider than the bridges of a row at the center of the shadow mask, the latter bridges having a width of 120 μm to 150 μm. It has been found that such a shadow mask is not so easily destroyed during the drape drawing process in which it is formed into its curved shape.

The brightness distribution in the picture is improved, if according to the invention, the widths of the bridges increase progressively from row to row, preferably substantially linearly, from the center to the edge of the shadow mask, because then no discontinuity in the electron transmission occurs.

In known methods shadow masks are generally made from a thin iron sheet. In such methods both sides of the sheet are covered with a layer of photosensitive lacquer. Reproduction masks are then placed on the lacquer layers and the lacquer is exposed to light through the production masks in the places where they are transparent. The lacquer is then developed and removed in the places where apertures are to be provided in the shadow mask. The sheet is then exposed to an etchant which dissolves the metal in those places which are no longer protected by the lacquer, so that cavities are formed on both sides of the sheet. When etching is continued, the cavities on both sides of the sheet unite forming a pattern of apertures. It is important that the centers of the cavities on both sides should be either exactly opposite each other over the entire sheet or shifted relative to each other in an accurate and known manner.

It is to be noted that the term reproduction mask is to be understood to include both a positive and negative copy of a reproduction mask which has the same pattern of transparent and opaque regions as the shadow mask. A positive copy is to be understood to mean a sheet which is opaque except where the apertures of the shadow mask are reproduced as transparent regions and a negative copy is to be understood to mean a sheet which is transparent except where the apertures of the shadow mask are reproduced as opaque regions. Reproductions masks may be either working masks which are used directly in manufacturing the shadow mask or master masks used in making other reproduction masks.

According to the invention, such a display tube with a shadow mask having bridges whose width per row is constant and increases substantially linearly per row from the row through the centre to the row at the edge of the shadow mask, can be manufactured in a simple manner by using a first pattern having a number of parallel stripe-shaped light-pervious regions and a second pattern of a number of substantially elongate light-pervious regions of substantially uniform dimensions situated in the elongation of each other is printed twice on photo-sensitive material. The second pattern, before it is printed for the second time, is rotated in a manner such that the dimension of the regions situated at the edge increase by at least 20% on the copy in the direction in of rotation. Thereafter, the reproduction masks are made by means of the resulting third pattern and the first pattern and the apertures are provided in the thin metal sheet by a photo-etching process, after which the shadow mask is finished in the usual manner, and mounted in the display tube.

Alternatively, it is possible to make a master mask from the third and the first pattern via a copy. The master mask is then used to make working masks which in turn are used to fabricate the shadow mask in the manner described above.

Figure 2:
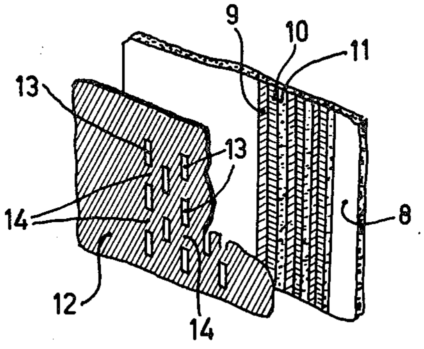
Figure 3:
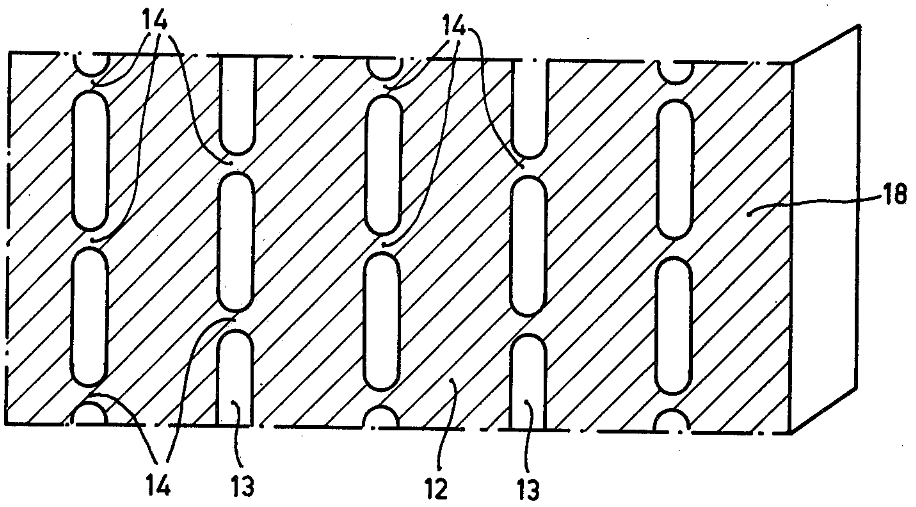
Figure 4:
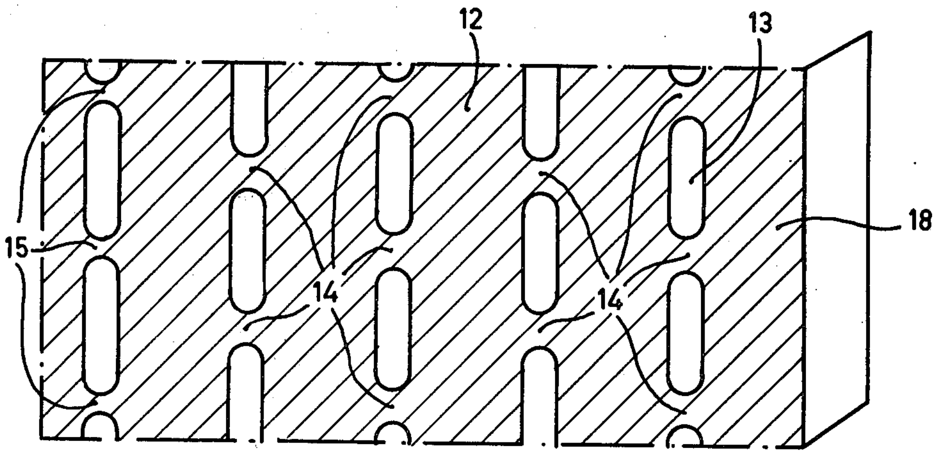
Figure 5:
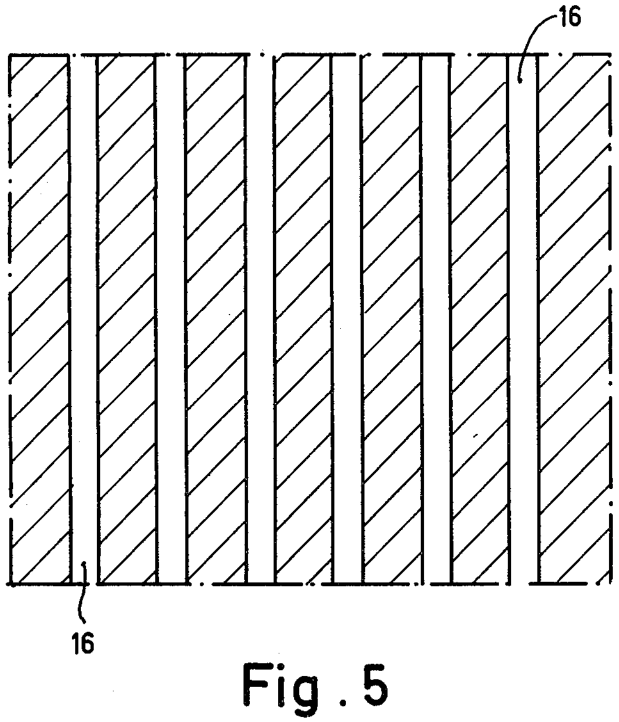
Figure 6:
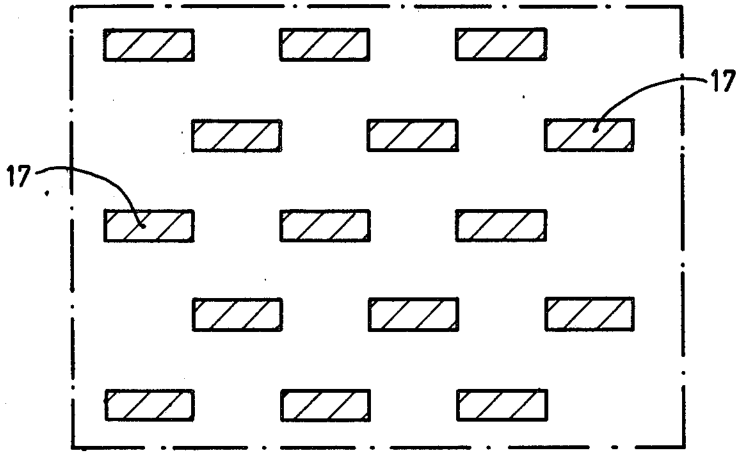
Figure 7:
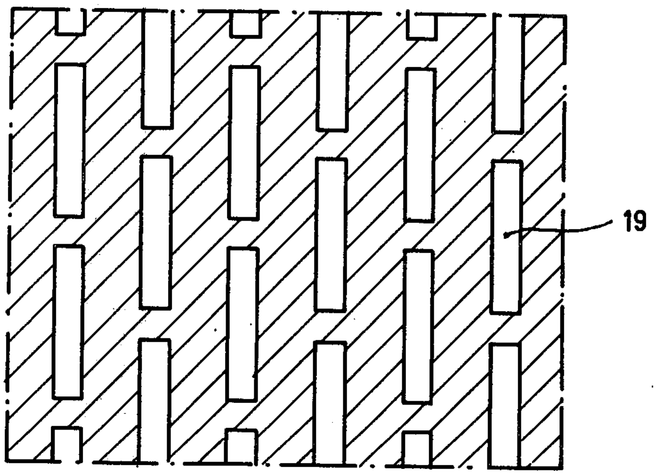
Figure 8:
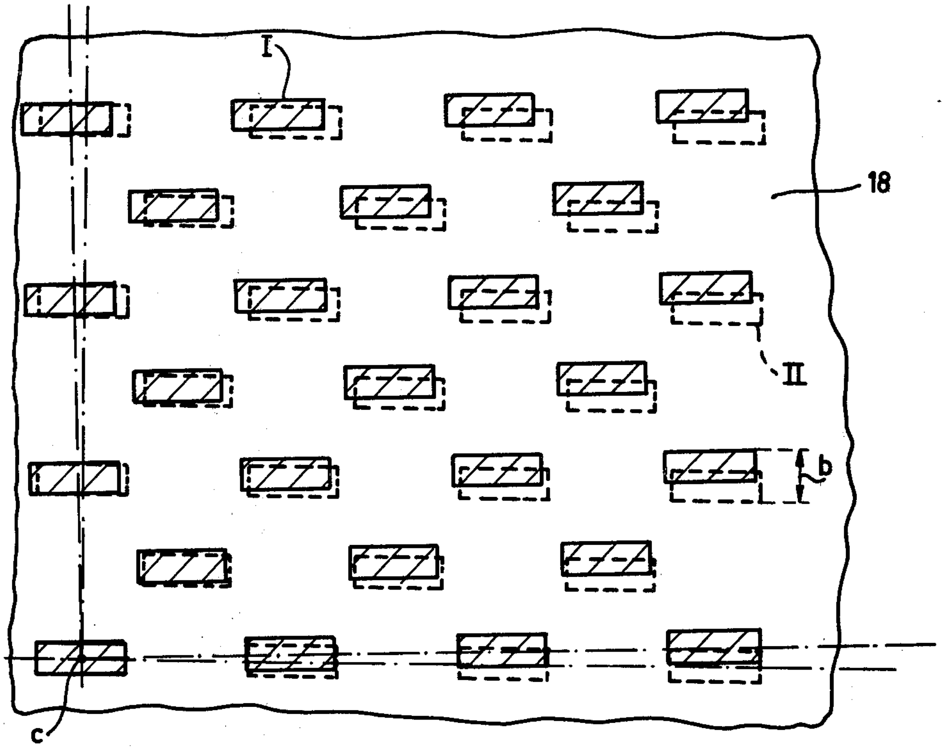
Figure 9:
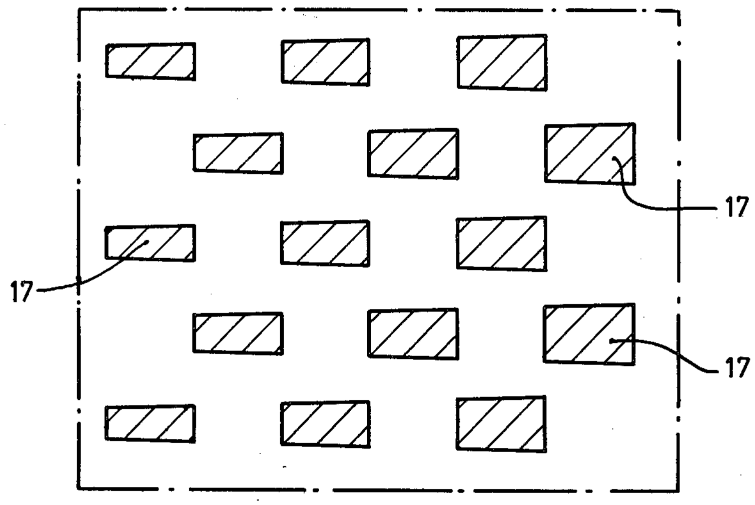
Figure 10:
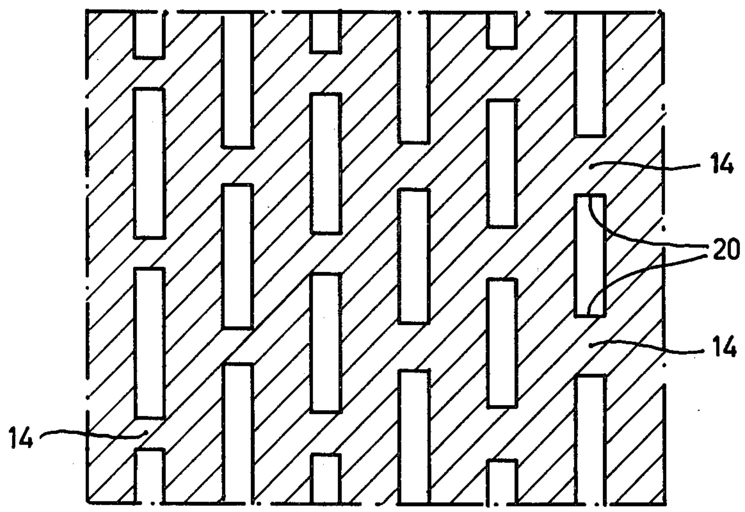

The invention will now be described in greater detail with reference to the drawings, in which:

FIG. 1 shows a partly cut away perspective view of a colour display tube according to the invention, FIG. 2 is a fragmentary view of the shadow mask and display screen of the tube of FIG. 1, FIG. 3 diagrammatically shows an edge portion of a known shadow mask, and FIG. 4 shows an edge portion of the shadow mask according to the invention, FIG. 5 shows part of a pattern of strips used in making a reproduction mask, FIG. 6 shows part of a pattern of elongate regions used in making a reproduction mask, FIG. 7 shows a part of a known reproduction mask, FIG. 8 shows part of a pattern produced by two exposures of the pattern of FIG. 6, FIG. 9 shows schematically part of the pattern of FIG. 8 after development, and FIG. 10 shows a part of a reproduction mask according to the invention.

FIG. 1 diagrammatically shows a cathode ray tube with a shadow mask 12 made in accordance with the invention. The tube includes a glass envelope 1 with three electron guns 2, 3 and 4 for generating three electron beams 5, 6 and 7 which pass through apertures 13 in the shadow mask 12 and impinge upon the phosphor lines 11, 10 and 9, respectively, on the display screen 8. The electron guns 2, 3 and 4 are arranged with their axes in a common plane which is normal to the phosphor lines 9, 10 and 11 on the display screen 8. Phosphor line triplets luminescing in three different colours are provided by means of a known photographic process.

FIG. 2 shows a portion of the shadow mask 12. The shadow mask has a plurality of rows of elongate apertures 13 separated by bridges 14. The bridges generally have a width of 150 μm measured along the rows, while the length of the apertures is approximately 650 μm. The mutual distance between the rows of apertures is usually 700 μm. The thickness of the sheet from which shadow masks are manufactured is usually 100 μm to 150 μm.

FIG. 3 shows an edge portion of a known shadow mask with corresponding reference numerals. The apertures have a length of 625 μm and the bridges are 150 μm wide everywhere. In order to increase the transmission, the apertures may be alternatively longer and the bridges narrower. Such a construction presents problems in drape drawing the mask since the bridges are so narrow (e.g. 120 μm) that they may be easily destroyed, in particular, at the edge 18 and in the corners of the mask.

FIG. 4 shows an edge portion of the shadow mask 12 of the tube of FIG. 1. The bridges 14 in each of the four outermost rows of apertures nearest the edge 18 are in this case 30% wider than the bridges 15 in the remaining rows. With the usual shadow mask thicknesses this has been found to be sufficient to prevent destruction at the edge 18 and in particular in the corners of the shadow mask during drape drawing. Alternatively, it is possible to increase the width of the bridges in each row progressively from row to row. Preferably, the width of the bridges increases in substantially equal steps, from the row at the center of the shadow mask to the rows at two opposite edges 18. Such a construction results in a favourable brightness distribution across the screen because there is no abrupt change in the electron transmission of the mask between adjacent rows.

FIGS. 5, 6 and 7 illustrate a method of making a reproduction mask used in the manufacture of such a shadow mask. FIG. 5 shows a part of an array of light-impervious stripe-like regions 16 alternating with light-pervious regions. FIG. 6 shows an array of elongate light-pervious regions 17 of substantially uniform dimensions extending in parallel rows on a light-impervious background.

Contact printing on photosensitive material of the arrays of FIGS. 5 and 6 or by putting these arrays on each other provides a known reproduction mask having light-pervious regions 19 as shown in FIG. 7. This is a positive copy, it is, of course, also possible to make a negative copy by contact printing in an analogous manner.

FIG. 8 illustrates a step in the manufacture of an array for making a reproduction mask according to the invention. Photosensitive material on a transparent sheet is exposed twice through the array of FIG. 6 as indicated by the solid and dashed lines I and II respectively in FIG. 8. Between exposures, the sheet and the array are rotated relative to one another about their common center c so that the width b of the regions 17 in the row situated nearest the edge 18 is at least 20% larger than the width of the regions in the row through the center c. In this manner the array shown in FIG. 9 is obtained which, in combination with the array shown in FIG. 5, is used to make a reproduction mask of the invention shown in FIG. 10. The widths of the bridges are constant along each individual row but increase in substantially equal steps from one row to another outwards from the center. It is alternatively possible to make the second exposure only through the portion of the array of FIG. 6 which is situated near each of the two opposite edges by screening the remainder of the array during the second exposure. This results in only a few rows of apertures, for example four, nearest the edge 18 having wider bridges 14 as shown in FIG. 4.

The elongate apertures 13 are often rounded off at their ends 20 owing to the etching treatment, as illustrated in FIG. 4.

What is claimed is:

1. In a photographic method of making a reproduction mask used in the fabrication of shadow masks for color display tubes, the improvement comprising the steps of exposing a photosensitive layer on a sheet to light through a pattern of generally parallel, elongated light pervious regions of generally uniform size to produce on said sheet a pattern of exposed areas corresponding to the pattern of said regions, rotating one of said sheet and said pattern relative to the other by an amount such that the projection of said pattern of said regions onto said sheet is displaced from and overlaps said pattern of exposed areas, and repeating said exposing step to produce on said sheet a pattern of exposed areas which at the periphery of said last-named pattern, are enlarged in the direction of rotation.

2. The method according to claim 1 wherein said rotation is about the center of said pattern of said regions.

3. The method according to claim 2 wherein said amount of rotation is such that the dimension of said enlarged areas in said direction is at least 20% greater than the corresponding dimension of the associated regions.

4. In a photographic method of making a shadow mask having a plurality of parallel rows of apertures with bridges between adjacent apertures in said rows by exposing a sheet coated with photosensitive material to light through a pattern of light pervious and opaque regions corresponding to the desired pattern of said apertures and said bridges and perforating said sheet at the areas corresponding to the apertures, the improvement comprising:

exposing said photosensitive coating on said sheet to light through a first pattern of alternately opaque and light pervious substantially parallel stripes;

exposing said sheet to light through a second pattern of light pervious regions of substantially uniform size to produce on said sheet a pattern of exposed and unexposed areas corresponding to a pattern of said apertures and bridges, rotating one of said sheet and said second pattern relative to the other by an amount such that the projection of said second pattern onto said sheet is displaced from and overlaps the areas of said pattern of areas corresponding to said bridges, and repeating said exposing step to produce on said sheet a pattern of said areas in which the areas at the periphery of said last-named pattern corresponding to said bridges are enlarged in the direction of rotation.

5. The method according to claim 4 wherein said amount of rotation is such that the dimension of said enlarged areas in said direction is at least 20% greater than the corresponding dimension of the associated regions of said second pattern.

* * * * *